UNITED STATES PATENT OFFICE.

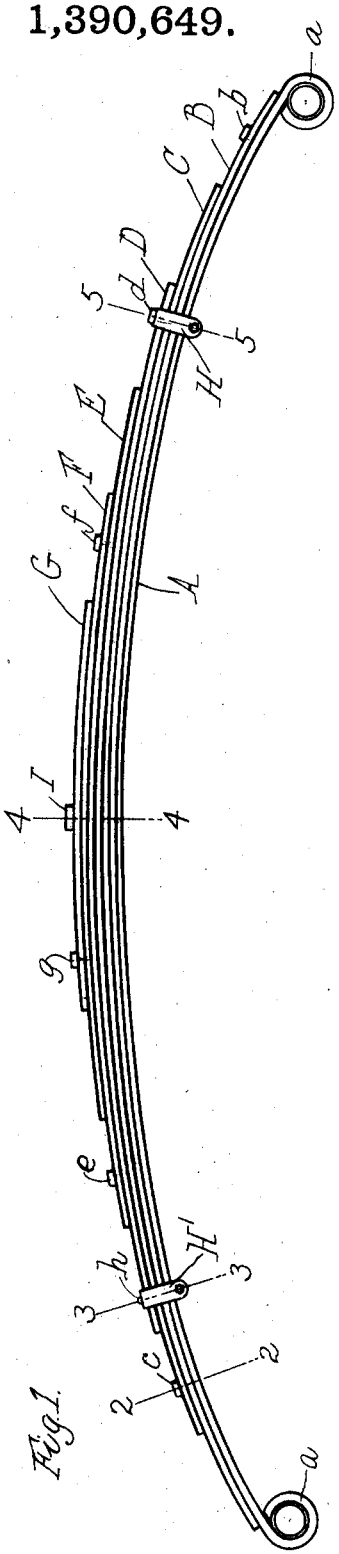

WILLIAM EDWARD SLATER, OF BUFFALO, NEW YORK, ASSIGNOR TO BUFFALO AUTOMOBILE SPRING COMPANY, INC., OF BUFFALO, NEW YORK.

LEAF-SPRING.

1,390,649.  Specification of Letters Patent.  Patented Sept. 13, 1921.

Application filed April 15, 1920. Serial No. 374,020.

*To all whom it may concern:*

Be it known that I, WILLIAM EDWARD SLATER, a citizen of the United States, residing at Buffalo, in the county of Erie and State of New York, have invented a new and useful Improvement in Leaf-Springs, of which the following is a specification.

This invention relates to springs of the kind comprising a plurality of substantially flat leaves, and more particularly to means for holding the leaves from shifting endwise relatively to each other.

In many springs of this kind as now made the leaves are held together by a central bolt or pin arranged in a hole in the center of the spring extending through all of the leaves. This construction so weakens the spring that when the spring is subjected to an exceptionally hard shock, it usually breaks at the center where the spring is weakened by the hole through which the bolt extends. Other springs are so made as to avoid the necessity of providing a central hole but involve constructions which greatly increase the cost of the springs and in some cases also weaken the springs in other respects.

The objects of this invention are to provide a spring in which the leaves are held from lengthwise movement relatively to each other by securing the leaves together in such a manner as to avoid weakening the spring in any way and so as not to materially increase the cost of making the same; also to provide a spring of this kind of improved riding qualities; also to improve the construction of springs in other respects hereinafter specified.

In the accompanying drawings:—

Figure 1 is a side elevation of a spring embodying the invention.

Figs. 2, 3, 4 and 5 are transverse sections thereof on lines 2—2, 3—3, 4—4, and 5—5 of Fig. 1 respectively.

The invention is shown in the accompanying drawings as applied to a semi-elliptic spring but it will be understood that it is not intended thereby to limit the invention to such use.

The spring shown in the drawing comprises a main leaf A provided at its ends with the usual eyes *a*, and leaves B, C, D, E, F and G of varying lengths which are superimposed upon the main leaf A. In order to secure the leaves of the spring together, each adjacent pair of leaves is secured together by any suitable securing means arranged adjacent to one end of the pair of leaves. The connections between adjacent pairs of leaves are preferably, but not necessarily, alternately arranged at opposite sides of the middle of the spring. In the construction shown, rivets are used for securing a pair of leaves together, but other connecting means may be provided if desired. In the spring shown, the spring leaves A and B are secured together by means of a rivet *b* arranged near the ends of the leaves, and the spring leaves B and C are connected by means of a rivet *c* extending through the end portions of these leaves, the rivets *b* and *c* being arranged at opposite sides of the center of the spring. The leaves C and D are connected by a rivet *d* which is so arranged that the rivets *c* and *d* are arranged at opposite sides of the center of the spring. In a similar manner the leaves D, E, F and G are connected by rivets *e*, *f* and *g*, which are so arranged that the rivets are alternately spaced at opposite sides of the center of the spring. In order to enable the leaves of the spring to lie flatly against each other, the lower heads of the rivets, in the construction shown, are countersunk into the spring leaves. By arranging the rivets as shown, the upper heads thereof are easily accessible so that if it is necessary to remove a leaf of the spring this can be easily done by cutting off the upper heads of the rivets holding the leaf to the spring. By this arrangement of the rivets or other connections between the spring leaves, the middle portion of the spring, which is subjected to the greatest strains, will not be in any way weakened, and the holes in the spring leaves through which the rivets extend are arranged at the end portions of the leaves, where the leaves are subjected to comparatively little strain, and where the slight local weakening of the individual spring leaves caused by the holes does not in any way weaken the spring. This arrangement securely holds the leaves against displacement lengthwise of the spring.

When a spring made as described is deflected, the movement of the leaves relatively to each other will increase in accordance with the distance from the connection between the leaves. At the middle portion of the spring, the adjacent leaves will move in opposite directions when the spring is flexed. This produces a large amount of relative movement between the leaves of the spring, and consequently produces a large amount of friction, which increases the stiffness of the spring and also to a certain extent causes the spring to act as a shock absorber. The increased movement between adjacent leaves also keeps the contacting surfaces between leaves in better condition and resists the tendency of adjacent leaves to become "frozen" or rusted together.

H H' represent the usual rebound clips which are commonly used on leaf springs. The clip H as shown in Figs. 1 and 5 is held in place on the spring by means of the rivet or fastening device $d$ which secures two of the spring leaves together. If desired other rebound clips used on the spring may be secured to the spring in the same manner, thus securely holding the clips in place and also avoiding the necessity of providing special means for securing the clips in place. If it is desired to space the clips evenly about the center of the spring the other clip H' may be secured on the spring in the usual manner, by means of a pin or the like $h$ extending into a hole in one of the spring leaves.

If it is desired to use the hereindescribed means for connecting the spring leaves in connection with the front spring of a Ford car or in connection with other springs in which the head of the usual central bolt or pin of the spring is employed for holding the spring in place on the vehicle, the following construction is preferably employed. The smallest leaf of the spring is provided at the center thereof with a plate or disk I which is preferably welded to the spring leaf and which serves to hold the spring in position on a vehicle in place of the head of the bolt or pin commonly used. By means of this construction the spring retains its full strength at the central portion thereof where the strength is most needed and the spring can be readily secured in place on the vehicle in the usual manner.

I claim as my invention:

1. A spring including a plurality of spring leaves, and a plurality of connections between said leaves, each connection securing together a pair of adjacent spring leaves and arranged at a distance from the center of the spring and alternately at opposite sides of the center of the spring, whereby the bending of the spring will cause the leaves to move relatively to each other at the center of the spring.

2. A spring including a plurality of spring leaves, each of said leaves being formed of a continuous strip of material and a plurality of connections, each connection securing together a pair of adjacent spring leaves and arranged near one end of the pair of leaves, each pair of adjacent spring leaves being secured together by only one connection.

3. A spring including a plurality of spring leaves of successively varying lengths, members which connect adjacent pairs of spring leaves and each of which is arranged alternately near one end of the pair of leaves which it connects and beyond the end of an adjacent leaf, each leaf being connected to the leaf or leaves adjacent thereto so that all of said spring leaves are connected together, whereby the connecting members are accessible when the spring is assembled.

4. A spring including a plurality of spring leaves, and means for connecting adjacent pairs of leaves alternately in proximity to the ends thereof, said connecting means being successively arranged at opposite sides of the center of the spring.

5. A spring including a plurality of spring leaves, means for connecting each leaf, except the outer leaves of the spring, at one side of the center of the spring with a leaf engaging one face thereof, and at the other side of the center of the spring with a leaf engaging the other face thereof, and means for connecting each of said outer leaves to the adjacent leaf at one side of the center of the spring.

6. A spring including a plurality of spring leaves, a plurality of connections, each connection securing together a pair of adjacent spring leaves and arranged alternately near one end of the pair of leaves, and a holding part welded to the middle portion of the outer leaf, whereby the middle portion of the spring will be unweakened.

Witness my hand this 14th day of April, 1920.

WILLIAM EDWARD SLATER.

Witnesses:
EARL PLANTZ,
EDITH SKARIN.